3,441,202
NOISE DAMPENING IN HERMETIC
REFRIGERANT COMPRESSORS
Knud V. Valbjorn and Kjeld Kjeldsen, Nordborg, Denmark, assignors to Danfoss A/S, Nordborg, Denmark, a company of Denmark
Filed Mar. 22, 1967, Ser. No. 625,062
Claims priority, application Germany, Mar. 22, 1966, D 49,662
Int. Cl. F04b 39/00, 39/02
U.S. Cl. 230—232
7 Claims

ABSTRACT OF THE DISCLOSURE

Hermetic refrigerant compressor provided with noise-suppressor in lubricant suction for substantially suppressing transmission of noise from internally of the hermetic capsule walls, through the lubricant. The noise suppressor comprises an elastic tube attached to the lubricant suction.

---

This invention relates generally to motor-compressors and more particularly to refrigerant compressors.

The suppression of noise generated in refrigerators by hermetically sealed refrigerant compressors has been for a long time a major problem. Experts have attempted to reduce the noise level in various forms. Many different techniques have been tried. Resilient suspension of the motor-compressor units within the hermetic capsules reduces generation of noise and prevents or reduces transmission of sound to the capsule or housing directly. Moreover, elastic connections in the internal conduits of the refrigerant systems has been used for silencing, as much as possbile, refrigerators. Furthermore internal silencers in the refrigerant cycle, for example suction and discharge silencers, are used in order to preclude transmission or travel of noise externally of the capsule through the cooling agent itself.

It is a principal object of the present invention to provide noise damping on a new and improved refrigerant compressor construction.

A feature of the noise dampener or suppressor in accordance with the invention is the use of noise-suppression means in the suction of the lubricating system of a hermetic motor-compressor for eliminating transmission of noise from internally of a hermetic capsule to externally thereof through the lubricating medium.

The invention recognizes that a considerable amount of sound or mechanical vibration energy can reach the capsule or case along a path comprising the pumping or lubricating elements by transmission of sound from the compressor unit to the lubricating oil which is in contact with the inner wall surfaces of the hermetic capsule.

In order to carry out the invention lubricant or oil suction is taken by a tube made of a material having a high inner damping capacity so that it is a material having the property of absorbing acoustic or sound energy so that only a very reduced amount of acoustic linking exists between the motor-compressor and the oil. The material employed comprises a material having a low characteristic impedance thus having the property of transmitting only a very reduced amount of acoustic energy to the oil. The term "impedance" as used herein refers to the product of the specific weight of the material and the velocity of sound.

If the material for the suction element of the lubricant is selected with this in mind it is possible to use a material with an inner damping capacity a thousand times larger than that of steel and/or with a characteristic impedance which is a thousand times smaller than that of steel. The suction element may consist, for example, of a material having the elasticity of rubber. Such a material may be natural rubber or some type of synthetic rubber or any other resilient synthetic material, for example Teflon, having the properties of natural rubber. Moreover, if the device is to be made of metal, alloys can be used that greatly reduce noise transmission for example a manganese-copper alloy.

Moreover the suction element or device may be made in two layers one of which has a lower impedance than steel and the other having a higher damping capacity than steel.

It has been found that by use of the principles of the invention the transmission of sound through the lubricating oil may be reduced by a factor of $10^3$ or higher.

Other features and advantages of the noise dampener and suppressor in accordance with the present invention will be better understood as described in the following specification and appended claims, in conjunction with the following drawings in which:

Figure 1:
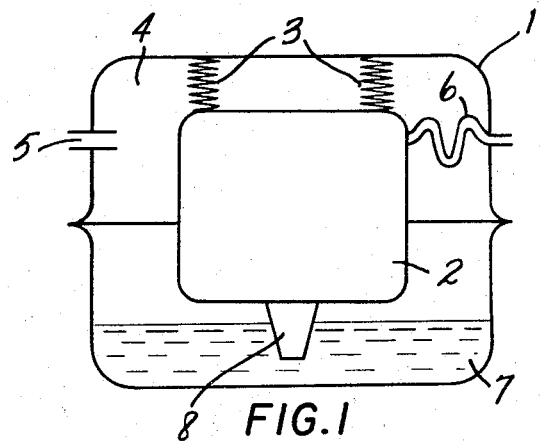
FIG. 1 is a diagrammatic sectional view of a refrigerant compressor provided with a device in accordance with the invention.
Figure 2:
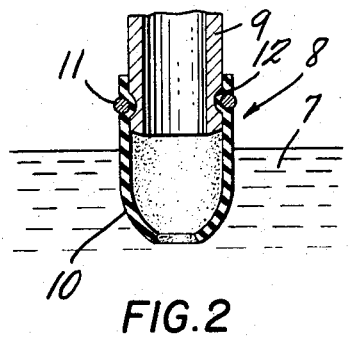
FIG. 2 is a diagrammatic fragmentary sectional view of an enlarged scale of a detail of the lubricating system of the apparatus illustrated in FIG. 1.

While the invention will be discussed as applied to motor-compressors for refrigerants for use in refrigerators and air conditioners and the like it will be understood that the invention is equally applicable to motor-compressors in housings or capsules in which an oil sump having a lubricating fluid therein can transmit noise from internally of the housing or capsule to externally thereof through the lubricant.

As shown in the drawing a hermetic capsule 1, made for example of metal, internally thereof a refrigerant compressor or motor-compressor unit 2 resiliently suspended by a suspension system illustrated diagrammatically by springs 3. It will be understood that the suspension system may be any of the known systems that resiliently supports the motor-compressor and keeps it from banging up against the inner wall surfaces of the hermetic capsule and is constructed for itself eliminating transmission of noise from internally of the capsule to externally thereof.

The case or capsule 1 has a vacuum existing in the interior space 4 of the capsule and the motor-compressor is connected to a suction inlet 5 to an evaporator, not shown. A discharge conduit or pipe 6 connects the motor-compressor to the case for delivery of a refrigerant to a cooling fluid circuit or the like, not shown. The diagrammatic illustrations of the connections of the compressor to the refrigerant system illustrate conduits or pipes that are for example themselves resilient or sinuous to preclude transmission of noise to the exterior of the capsule. The motor-compressor 2 may be provided with suction and discharge silencers, not shown. The compressor is of the type lubricated by a lubricating system, not shown obtaining a liquid lubricant or oil from an oil sump 7.

In order to reduce or suppress the transmission of mechanical vibration such as sound waves or noise, through the lubricant, from the operating machinery or apparatus within the case to the side walls of the capsule 1 the lubricating system of the apparatus is provided with a noise-suppressor 8 which is the suction element of the lubricating system, not shown. The lubricating system comprises a metallic tubular shaft or tube 9, connected to a pressure pump, not shown.

The noise suppression element 8 comprises a rubber tube 10 having a conical or tapered lower end. The tube 10 extends downwardly into the oil in the oil sump 7 and is the only link between the lubricant and the motor-compressor. The tube is held in fixed position by clip or clamp 11 deforming and clamping the tube in registry with a circumferential groove 12 on the metallic tube 9.

Those skilled in the art will understand that the suction structure 8 may be rotatably driven for lifting oil to the lubricating system or may be a suction on a pump etc. Different modes of taking a suction are known and the structure 8 may be applicable to any of these systems using "suction" means generally of the type shown.

The tube 10 is of a material, for example rubber, having an impedance characteristic ranging from $$40 \text{ to } 300 \cdot \frac{10^2 \text{ kg.}}{m^2 \cdot \sec.}$$

This value can be compared with the impedance of steel which is in the order of $$39,000 \cdot \frac{10^2 \text{ kg.}}{m^2 \cdot \sec.}$$

The material employed has a coefficient or modulus of elasticity in the order of $3 \times 1,000,000$ Newton/m². The damping coefficient is, therefore, the same. The value of damping for this rubber material is $\frac{1}{10}$ while that for steel is $\frac{1}{80,000}$.

Figure 3:
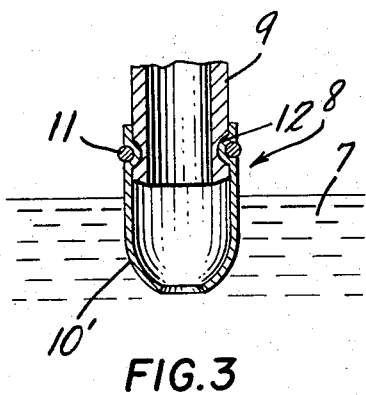
FIG. 3 is a fragmentary section view of another embodiment of a device according to the invention.

It has been found that in certain situations, FIG. 3, it may be desirable to use a metallic tube or suction element 10 in which case an alloy composition of manganese and copper may be used. The alloy should comprise 70 percent manganese and 30 percent copper. In which case the specific damping is fifty times greater than that of carbon steels.

Moreover, it has been found that the tube 10 may be made of Teflon which has a suitable impedance characteristic and modulus of elasticity or damping coefficient.

Figure 4:
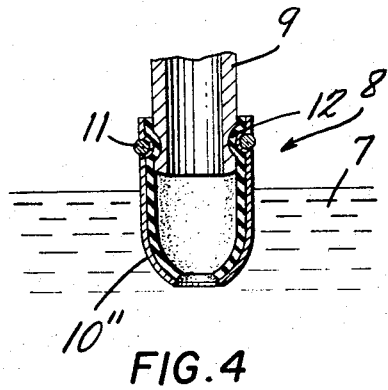
FIG. 4 is a fragmentary section view of a third embodiment of a device according to the invention.

Furthermore, the suction element and/or the tube 10 may likewise be made, in certain situations, of an inner layer of rubber and an outer layer of the manganese-copper alloy. The material having the greater damping capacity should comprise the inner layer. Such a construction is illustrated in FIG. 4 in which a tube 10 is made in two layers.

Those skilled in the art will recognize that the concepts and principles of the invention are applicable not only to suction elements of the type illustrated but apply also to any of the elements for transport of a fluid in a capsule, for example pipe structure and the like, submerged in the oil in the sump and which would tend to transmit noise from the motor-compressor to the liquid and thereby to the sump walls unless constructed in the manner of the invention.

While a preferred embodiment of the invention has been shown and described it will be understood that many modifications and changes can be made within the true spirit and scope of the invention.

What we claim and desire to be secured by letters patent is:

1. In a hermetic compressor having a hermetic capsule, a motor-compressor unit housed in said capsule, said capsule having a sump in which a lubricating fluid is contained in operation for lubricating said motor-compressor unit, the motor-compressor comprising means for taking a suction on said lubricating fluid for delivery to said motor-compressor unit for lubrication thereof, the improvement which comprises noise-suppression means connected to said suction means for substantially precluding transmission of noise from said motor-compressor unit to said capsule through said lubricating fluid comprising, a tube made of an elastic material extending into said lubricating fluid of a length such that only said tube extends into said lubricating fluid, said tube having a capacity for damping noise greater than the capacity of iron and steel for damping noise, and said material comprising a manganese-copper alloy.

2. In a hermetic compressor according to claim 1, in which said manganese-copper alloy comprises about seventy percent manganese and about thirty percent copper.

3. In a hermetic compressor having a hermetic capsule, a motor-compressor unit housed in said capsule, said capsule having a sump in which a lubricating fluid is contained in operation for lubricating said motor-compressor unit, the motor-compressor comprising means for taking a suction on said lubricating fluid for delivery to said motor-compressor unit for lubrication thereof, the improvement which comprises noise-suppression means connected to said suction means for substantially precluding transmission of noise from said motor-compressor unit to said capsule through said lubricating fluid comprising, a tube made of an elastic material extending into said lubricating fluid of a length such that only said tube extends into said lubricating fluid, said tube having a capacity for damping noise greater than the capacity of iron and steel for damping noise, and said elastic material having an elasticity of rubber and an impedance from about $$4 \text{ to } 300 \cdot \frac{10^2 \text{ kg.}}{m^2 \cdot \sec.}$$

4. In a hermetic compressor having a hermetic capsule, a motor-compressor unit housed in said capsule, said capsule having a sump in which a lubricating fluid is contained in operation for lubricating said motor-compressor unit, the motor-compressor comprising means for taking a suction on said lubricating fluid for delivery to said motor-compressor unit for lubrication thereof, the improvement which comprises noise-suppression means connected to said suction means for substantially precluding transmission of noise from said motor-compressor unit to said capsule through said lubricating fluid comprising, a tube made of an elastic material extending into said lubricating fluid of a length such that only said tube extends into said lubricating fluid, and said tube having a capacity for damping noise greater than the capacity of iron and steel for damping noise, said tube having two layers of material comprising an inner layer and an outer layer, and said inner layer comprising material having a damping capacity greater than that of steel and said outer layer comprising material having an impedance characteristic lower than the impedance characteristic of steel.

5. In a hermetic compressor according to claim 4, in which said inner layer material comprises rubber and in which said outer layer material comprises a manganese-copper alloy comprising substantially seventy percent manganese and about thirty percent copper.

6. In a hermetic compressor having a hermetic capsule, a motor-compressor unit housed in said capsule, said capsule having a sump in which a lubricating fluid is contained in operation for lubricating said motor-compressor unit, the motor-compressor comprising means for taking a suction on said lubricating fluid for delivery to said motor-compressor unit for lubrication thereof, the improvement which comprises noise-suppression means connected to said suction means for substantially precluding transmission of noise from said motor-compressor unit to said capsule through said lubricating fluid comprising, a tube made of an elastic material extending into said lubricating fluid of a length such that only said tube extends into said lubricating fluid, and said tube having a capacity for damping noise greater than the capacity of iron and steel for damping noise, and said elastic material comprising a material having an elasticity about the elasticity of rubber.

7. In a hermetic compressor according to claim 6, in which said elastic material comprises Teflon.

References Cited

UNITED STATES PATENTS

| | | | |
|---|---|---|---|
| 2,287,203 | 6/1942 | Smith | 230—232 |
| 2,990,111 | 6/1961 | Bohn | 230—232 |

ROBERT M. WALKER, *Primary Examiner.*

U.S. Cl. X.R.

230—206